(12) United States Patent
Ueberschlag

(10) Patent No.: US 8,881,603 B2
(45) Date of Patent: Nov. 11, 2014

(54) MEASURING DEVICE AND METHOD HAVING SUPERIMPOSED REFLECTED FIRST MEASUREMENT SIGNAL WITH A SECOND MEASUREMENT SIGNAL

(75) Inventor: Pierre Ueberschlag, Saint-Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 411 days.

(21) Appl. No.: 13/377,204

(22) PCT Filed: May 17, 2010

(86) PCT No.: PCT/EP2010/056683
§ 371 (c)(1),
(2), (4) Date: Dec. 9, 2011

(87) PCT Pub. No.: WO2010/142512
PCT Pub. Date: Dec. 16, 2010

(65) Prior Publication Data
US 2012/0079890 A1    Apr. 5, 2012

(30) Foreign Application Priority Data

Jun. 12, 2009 (DE) .......................... 10 2009 026 912
Aug. 24, 2009 (DE) .......................... 10 2009 028 847

(51) Int. Cl.
| G01F 1/66 | (2006.01) |
| G01F 23/284 | (2006.01) |
| G01F 23/296 | (2006.01) |
| G01S 15/12 | (2006.01) |

(52) U.S. Cl.
CPC .............. *G01S 15/12* (2013.01); *G01F 23/284* (2013.01); *G01F 23/2962* (2013.01); *G01F 1/667* (2013.01)
USPC ..................................................... 73/861.25

(58) Field of Classification Search
None
See application file for complete search history.

(56) References Cited

U.S. PATENT DOCUMENTS

| 4,334,431 A | 6/1982 | Kohno et al. |
| 5,233,352 A | 8/1993 | Cournane |

(Continued)

FOREIGN PATENT DOCUMENTS

| DE | 4114650 A1 | 12/1992 |
| DE | 19934212 A1 | 2/2000 |
| DE | 10003094 A1 | 7/2001 |
| DE | 102008010090 A1 | 9/2008 |

(Continued)

OTHER PUBLICATIONS

International Search Report bsed on PCT/EP2010/056683 filed May 17, 2010 (German Language).

(Continued)

*Primary Examiner* — Harshad R Patel
(74) *Attorney, Agent, or Firm* — Bacon & Thomas, PLLC

(57) ABSTRACT

Method and measuring device for measuring at least one measured variable. A first sensor transmits a first measurement signal, which includes at least one half-wave of a mechanical wave or an electromagnetic wave, and, at a time t from the first measurement signal, transmits at least a second measurement signal. At least a second sensor receives the measurement signals. The travel time and $TOF_1$ of the first measurement signal between transmitting of the first measurement signal and receiving of the first measurement signal is known, wherein the time t is so selected that it is a whole numbered multiple of the travel time $TOF_1$ of the first measurement signal or that it is a whole numbered multiple of the average value of the travel times $TOF_1$ and $TOF_2$, wherein the travel time and TOF2 between transmitting a third measurement signal from the second sensor and receiving of the third measurement signal by the first sensor is known.

13 Claims, 3 Drawing Sheets

(56) References Cited

U.S. PATENT DOCUMENTS

| | | |
|---|---|---|
| 5,325,726 A | 7/1994 | Krieg |
| 5,877,997 A * | 3/1999 | Fell .............................. 73/290 V |
| 6,546,810 B1 * | 4/2003 | Beauducel et al. ........ 73/861.27 |
| 7,254,494 B2 | 8/2007 | Botter |
| 7,934,432 B2 | 5/2011 | Kuhn et al. |
| 2008/0208056 A1 | 8/2008 | Kuhn et al. |
| 2008/0250869 A1 * | 10/2008 | Breed et al. ................ 73/861.27 |

FOREIGN PATENT DOCUMENTS

| | | |
|---|---|---|
| EP | 0570140 A1 | 11/1993 |
| JP | 5877679 A2 | 5/1983 |
| WO | 9624027 A2 | 8/1996 |

OTHER PUBLICATIONS

Research Report (German Language).

\* cited by examiner

MEASURING DEVICE AND METHOD HAVING SUPERIMPOSED REFLECTED FIRST MEASUREMENT SIGNAL WITH A SECOND MEASUREMENT SIGNAL

TECHNICAL FIELD

The present invention relates to a method for measuring at least one measured variable and to a measuring device, wherein a first sensor transmits a first measurement signal, which is receivable by a second sensor, and, at a time t from the first measurement signal, transmits at least a second measurement signal, and wherein at least a second sensor receives the measurement signals, wherein the travel time TOF (time of flight) of the measurement signal between transmitting of the measurement signal and receiving of the measurement signal is known.

The present invention also relates to a method for determining and/or monitoring a process variable. The process variable is e.g. the volume- or mass flow of a medium through a measuring tube or the fill level of a fill substance in a container.

BACKGROUND DISCUSSION

Ultrasonic flow measuring devices are often applied in process- and automation technology. They permit determination, in a simple manner, of the volume flow and/or mass flow in a pipeline.

Known ultrasonic, flow measuring devices work frequently according to the Doppler principle or the travel-time difference principle. In the travel-time difference principle, different travel times of ultrasonic pulses relative to the flow direction of the liquid are evaluated. For this purpose, ultrasonic pulses are transmitted at a certain angle to the tube axis both with, as well as also counter to, the flow. From the travel-time difference, the flow velocity can be determined, and therewith, in the case of a known diameter of the pipeline section, the volume flow.

In the case of the Doppler principle, ultrasonic waves with a determined frequency are coupled into the liquid and the ultrasonic waves reflected from the liquid evaluated. From the frequency shift between the coupled and reflected waves, likewise the flow velocity of the liquid can be determined. Reflections in the liquid occur, when small air bubbles or impurities are present in the liquid, so that this principle is mainly applied in the case of contaminated liquids.

The ultrasonic waves are produced and, respectively, received with the assistance of ultrasonic transducers. For this, ultrasonic transducers are emplaced in the tube wall of the relevant pipeline section. More recently, also clamp-on ultrasonic flow measuring systems are obtainable. In the case of these systems, the ultrasonic transducers are held pressed to the tube wall with a clamp. A great advantage of clamp-on ultrasonic flow measuring systems is that they do not contact the measured medium and can be placed on an already existing pipeline. Such systems are known e.g. from EP 686 255 B1, U.S. Pat. No. 4,484,478 or U.S. Pat. No. 4,598,593.

A further ultrasonic, flow measuring device, which works according to the travel-time difference principle, is disclosed in U.S. Pat. No. 5,052,230. Travel time is ascertained, in such case, by means of short ultrasonic pulses, so-called bursts.

Ultrasonic transducers are normally composed of an electromechanical transducer element, e.g. a piezoelectric element, also referred to as a 'piezo' for short, and a coupling layer, also referred to as a coupling wedge or, not so frequently, a lead-in element. The coupling layer is, in such case, most often, composed of synthetic material, e.g. plastic, while the piezoelectric element is, in industrial process measurements technology, usually a piezoceramic material. The ultrasonic waves produced in the piezoelectric element are led via the coupling layer to the tube wall and from there into the liquid. Since the velocities of sound are different in liquids and synthetic materials, the ultrasonic waves are refracted at the transition from one medium to the other. The angle of refraction is determined in a first approximation according to Snell's law. The angle of refraction is, thus, dependent on the ratio of the propagation velocities in the different media.

Between the piezoelectric element and the coupling layer, another coupling layer can be arranged, a so called adapting, or matching, layer. The adapting, or matching, layer performs, in such case, the function of transmission of the ultrasonic signal and simultaneously the reduction of a reflection at the interfaces between two materials caused through different acoustic impedances.

Furthermore, known from the state of the art are fill level, measuring devices for ascertaining and monitoring the fill level of a fill substance in a container or in an open flume by means of a travel-time measurement of ultrasound signals, which are frequently applied in many branches of industry, e.g. in the food industry, the water- and waste water fields and in chemistry. In a travel-time measurement, ultrasound signals are transmitted into the process space, or into the container interior; and the echo waves reflected on the surface of the fill substance in the container are received by a transmitting/receiving element. From the time difference between the transmitting of the ultrasound signals and the receipt the echo signals, the distance of the measuring device to the surface of the fill substance can be ascertained. Apparatuses and methods for determining fill level via the travel time of ultrasonic signals as well as also from other measurement signals, such as e.g. radar, utilize the physical law, according to which the travel distance equals the product of the travel time and the propagation velocity. By taking into consideration the geometry of the container interior and/or the geometry of the container, then fill level of the fill substance is ascertained as a relative or absolute parameter.

The producing of sound waves, or ultrasonic waves, and the sensing of reflected echo waves after a distance dependent travel time can occur through separate transmitting elements and receiver elements or by shared transmitting/receiver elements. In practice, most often, only a single transmitting/receiving element, a so-called ultrasound transceiver, is used, which produces a transmission signal and, receives, offset in time, a reflection signal, or echo signal. The ultrasound transceiver forms, for example, a composite oscillatory system, which is known in the literature as a Langevin oscillator. In DE 29 06 704 A1, there is disclosed, for example, the construction and operation of such a oscillator, which also is referred to as a tonpilz resonator. The core of a tonpilz resonator is a piezoelectric element, which is clamped by means of a securement screw between a radiating element and a counterelement and forms with this the composite oscillatory system.

The electromechanical transducer, such as e.g. a piezoelement, is operated in the vicinity of one of its mechanical resonance frequencies. In this way, resonance magnification can be utilized, in order to enlarge the transmission amplitude and to increase the sensitivity, in the case of the receipt.

A general problem in the case of travel-time difference methods is the distinguishing of the wanted signal from possible disturbance signals, such as e.g. reflections or tube waves.

SUMMARY OF THE INVENTION

An object of the invention is to provide a method and a measuring device, with which the travel times of a measurement signal between a transmitter and a receiver are ascertainable.

The object is achieved by a method for measuring at least one measured variable, wherein a first sensor transmits a first measurement signal, which first measurement signal includes especially at least one half-wave of a mechanical wave or an electromagnetic wave, especially the first measurement signal is a burst signal, and, at a time t from the first measurement signal, transmits at least a second measurement signal, which especially equals the first measurement signal, wherein at least a second sensor receives the measurement signals, wherein a travel time $TOF_1$ is the travel time of the first measurement signal between transmitting of the first measurement signal by the first sensor and receiving of the first measurement signal by the second sensor, and wherein a travel time $TOF_2$ is the travel time of a third measurement signal between the second sensor and first sensor, especially between transmitting of the third measurement signal by the second sensor and receiving of the first measurement signal by the first sensor The time t is so selected that an amplitude of a received measurement signal at the second sensor is maximum. The second measurement signal is, in such case, especially equal to the first measurement signal. The third measurement signal can be, in such case, both a measurement signal transmitted from the second sensor to the first sensor, as well as also a reflection of the first and/or second measurement signal from the second sensor to the first sensor.

The invention is based on the following principle: the measurement signals transmitted from the first sensor, thus especially the first and the second measurement signals, are reflected, e.g. on the second sensor, on a tube, or pipe, wall, or on the surface of a measured medium. In order to obtain the best possible signal strength, the reflections can be so superimposed with the measurement signal that the amplitude is maximum. This is to be achieved through a time shifting of t.

In a first further development of the method of the invention, the time t is so selected that the amplitude of the measurement signal received by the second sensor from a superpositioning of second measurement signal and reflections of the first measurement signal maximum is, especially from a superpositioning of second measurement signal and first measurement signal reflected by the second sensor to the first sensor and back to the second sensor.

Another further development of the invention provides that the time t is varied over a predetermined range. In this regard, for example, many measurement signals are transmitted with a constant offset t relative to one another from the first to the second sensor. After a settling time t, the amplitude measured by the second sensor in the case of otherwise constant system properties, such as e.g. flow and/or fill level, is constant, i.e. it does not change over a certain period of time. This amplitude is held together with the time t in a memory. Thereafter, the time t is changed. This is repeated; those skilled in the art speak, in this regard, of a sweep. This can be repeated until a break off criterion is fulfilled and the time between the measurement signals belonging to the maximum registered amplitude is tuned in. The point in time of the termination of the sweep is a classical optimizing problem to be performed with optimizing methods known to those skilled in the art.

In an additional further development of the solution of the invention, by means of the time t, the velocity of sound of a measured medium, through which sound is traveling, is ascertained. In this case, the medium is flowing e.g. through a measuring tube, and/or, by means of the time t, the fill level of a measured medium in a container is ascertained. This embodiment of the invention requires no other complex signal processing, in order to ascertain the velocity of sound or fill level.

The object is achieved furthermore by a method for measuring at least one measured variable, wherein a first sensor transmits a first measurement signal, which first measurement signal includes especially at least one half-wave of a mechanical wave or an electromagnetic wave, and, at a time t from the first measurement signal, transmits at least one further, second measurement signal, with also such second measurement signal including at least one half-wave of a mechanical wave or an electromagnetic wave, wherein at least one further, second sensor receives the measurement signals, wherein the travel time $TOF_1$ of the measurement signal between transmitting of the measurement signal and receiving of the measurement signals is known, wherein the time t is so selected that it is a whole numbered multiple of the travel time $TOF_1$ or that supplementally the travel time $TOF_2$ of a third measurement signal between transmitting of the third measurement signal by the second sensor and receiving of the third measurement signal by the first sensor is known and the time t is so selected that it is the sum of $TOF_1$ and $TOF_2$ divided by a natural number n, e.g. that the time t is a whole numbered multiple of the average value of the travel times $TOF_1$ and $TOF_2$, i.e. that the time t is so selected that it is a whole numbered multiple of $(TOF_1+TOF_2)/2$. In an example, t amounts to $2*(TOF_1+TOF_2)/2$, i.e. $t=TOF_1+TOF_2$. First and second sensors are in the case of an evaluating of the third measurement signal both applicable as transmitter than well as also as receiver. With this method, a measurement signal at a transmitter is so embodiable that the measurement signal incoming to the receiver is clearly receivable, i.e. the signal amplitude is clearly improved compared to the state of the art.

The measurement signals have, in each case, at least one half-wave of a mechanical wave or an electromagnetic wave. This holds both for the first measurement signal, as well as also for the second and the eventual third measurement signal. Physically considered, a wave transports energy, wherein a mechanical wave, e.g. a sound wave, propagates by oscillation of a chain of elastic attached masses, such as e.g. particles of a medium, wherein the masses are not permanently shifted. Electromagnetic waves, in contrast, require no medium and are also capable of propagation in vacuum. Known examples for electromagnetic waves are radio waves and light. Properties of a wave can be described e.g. via its parameters, amplitude, propagation velocity and frequency, or wavelength. Waves can occur as periodic waves or as shock waves. Therefore, half waves can also assume different forms, e.g. sinusoidal, rectangular or triangular. A wave is theoretically described via its wave equation, which gives a deflection from a zero line as seen at a location at a certain point in time. An extreme value of a half-wave would be thus e.g. a Dirac shock, which propagates through a space. A half-wave is generally bounded by zero points and is positive or negative. Its duration corresponds to a half period of the wave. If a negative half-wave follows directly on a positive half-wave of equal amplitude and equal wavelength, thus the time t from the beginning of the positive half-wave to the beginning of the negative half-wave $\lambda/2$, then there arises a wave of period $\lambda$. A signal of a plurality of half waves can, thus, comprise different frequencies.

In time t from the first measurement signal, at least one further, second measurement signal, thus at least one other, second half-wave, is transmitted from the first sensor. This happens according to an embodiment of the method of the invention especially after the first measurement signal, thus after the first half-wave. If the time t is calculated, starting from the beginning of the first measurement signal, thus especially from the beginning of the first half-wave of the first measurement signal, i.e. thus when the amplitude of the first half-wave of the first measurement signal is not equal to zero, as disclosed in a further development of the method of the invention, then, according to this above named embodiment of the invention, the second measurement signal, thus the beginning of the second half-wave can occur earliest $\lambda/2$ after the beginning of the first half-wave. In general t lies in the interval [0, T], wherein T is finite.

Other forms of embodiment of the solution of the invention are options for defining the starting point in time for determining the travel times $TOF_1$ and/or $TOF_2$ and therewith also for determining the time t of separation between the measurement signals, as will be explained further below in greater detail.

The time t between transmitting of the first measurement signal by the first sensor and transmitting of the second measurement signal by the first sensor is, according to the invention, a whole numbered multiple of the travel time $TOF_1$ of the first measurement signal between transmitting of the first measurement signal by the first sensor and receiving of the first measurement signal by the second sensor. I.e., the transmitting of the second measurement signal is adapted corresponding to the travel time of the first measurement signal. Whole numbers comprise especially all natural numbers 1, 2, 3, 4, 5, . . . . Furthermore, the whole numbers include 0 and the negative numbers with the magnitude of a natural number.

The measurement signals are received by at least one additional, second sensor. In an embodiment of the invention, the second sensor is constructively equally embodied as the first sensor. Especially, they are ultrasonic transducers of a fill-level measuring device or of a flow measuring device.

In another case, the time t is so selected that it is a whole numbered multiple of the average value of the travel times $TOF_1$ and $TOF_2$. The travel times $TOF_1$ and/or $TOF_2$ of the measurement signals between transmitting of the respective measurement signal and receiving of the corresponding measurement signal are known. In a further development of the method of the invention, the travel time $TOF_1$ and/or $TOF_2$ are determined by means of a measuring—they are measured. The travel time $TOF_2$ is measurable between the transmitting of the third measurement signal by the second sensor and the receiving of the third measurement signal by the first sensor.

The above already indicated additional forms of embodiment of the solution of the invention, which relate to the definition of the starting point in time for determining the travel times $TOF_1$ and/or $TOF_2$ and therewith also to the determining of the time t between the measurement signals, will now be discussed. Thus, for example, a rising or falling flank of the corresponding measurement signal is used as start- or stop-trigger. If thus the first derivative of a measurement signal assumes a certain value, then this point in time is taken as the beginning of the measurement signal. Another alternative is to consider a turning point in the measurement signal as the beginning of the measurement signal, an amplitude maximum. The variants discussed to this point possess the disadvantage of poor differentiating between noise and the actual measurement signal. In a further development, the travel time $TOF_1$ of the first measurement signal between transmitting of the first measurement signal by the first sensor and receiving of the first measurement signal by the second sensor determined is between the points in time of a first exceeding of a predeterminable first threshold value of the first measurement signal at the first sensor and a first exceeding of a predeterminable second threshold value of the first measurement signal at the second sensor. A variant is that the first and second threshold values are equal. The exceeding of a threshold value as a triggering event, or triggering of measurements, can be applied alone or in combination with the aforementioned features. The particular end-point in time is correspondingly equally selected. This list makes no claim to completeness. Other options for determining the travel time $TOF_1$ are known from the state of the art. Analogous concepts hold naturally also for the third measurement signal, or the travel time $TOF_2$ of the third measurement signal. The travel time $TOF_2$ of the third measurement signal between transmitting of the third measurement signal by the second sensor and receiving of the third measurement signal by the first sensor is determined between the points in time of a first exceeding of a predeterminable threshold value of the third measurement signal at the second sensor and a first exceeding of the threshold value of the third measurement signal at the first sensor.

Correspondingly, the time t between transmitting of the first measurement signal by the first sensor and transmitting of the second measurement signal by the first sensor is determined, according to a further development of the solution of the invention, by the time between the points in time of a first exceeding of a certain first threshold value of the first measurement signal at the first sensor and a first exceeding of a certain third threshold value of the second measurement signal at the first sensor. The first and the third threshold values and/or the above mentioned second threshold value can, in turn, be equal.

If, for example, two ultrasonic sensors of a flow measuring device are emplaced opposite to one another on a line at a predetermined angle to the principal flow direction of a measured medium in a measuring tube, the first ultrasonic sensor, the transmitter, transmits a first measurement signal to the second sensor, the receiver, and then, in the other direction, the second sensor, now the transmitter, transmits a third measurement signal to the first sensor now functioning as receiver, in order, from the different travel times $TOF_1$ and $TOF_2$ of the two measurement signals between the sensors, caused by the flow of the measured medium in the measuring tube, to calculate the flow of the measured medium through the measuring tube. The respective receiver receives, in addition to the signal referenced for determining the travel time, also other signals, caused by reflections. Besides the disturbing reflections, e.g. the reflection of the measurement signal on the tube, or pipe, wall, there arises also a reflection on the respective transmitter. The first of these reflections is registered by the receiver of the typically two travel times $TOF_1 + TOF_2$ after the arrival of the measurement signal. Other reflections of the same type occur at additional distances from two travel times $TOF_1 + TOF_2$. If the measurement signals are transmitted by the transmitter now with a time separation of two travel times $TOF_1 + TOF_2$, the measurement signals superimpose with said reflections on the receiver and the usable measurement signal is clearly amplified. Analogous concepts hold for fill level measurement, only with the difference that the travel times $TOF_1$ and $TOF_2$ are equal, since no measured medium "entrains" the sound. The travel time difference principle is consequently in the flow measurement, also often referred to as a "sound entrainment method". Therefore, in application of the method of the invention to fill level measuring technology, the determining of $TOF_2$ can be omitted. In this case, the following relationship holds: $2*TOF_1=TOF_1+TOF_2$.

A measurement signal is, according to an embodiment of the invention, thus, transmitted by the transmitter to the receiver for determining the travel time $TOF_1$ and/or $TOF_2$ of the measurement signal. The time separation of the additional measurement signals is set according to these conditions to a whole numbered multiple of the travel time $TOF_1$, e.g. to twice, or to a whole numbered multiple of $(TOF_1+TOF_2)/2$.

Especially, in flow measurement with ultrasound, wave packets, e.g. with 8, 16 or 32 bursts in fast sequence are transmitted one after the other from a first sensor through the measured medium to a second sensor. In such case, the measurement signal can travel on direct paths between the two sensors, in case the two sensors are arranged opposite one another, or the measurement signal is reflected on the measuring tube to the sensors. Thus, the travel time of the measurement signal is determined in one direction. After a short pause, the functions of the sensors are reversed. In such case, the second sensor transmits the wave packets to the first sensor. There results the travel time of the measurement signal into the other direction. Based on the two travel times, then the flow velocity of the measured medium in the measuring tube and therewith the flow rate of the measured medium in the measuring tube can be determined. This method is continually repeated. According to the method of the invention, then, for example, a single burst signal, respectively two burst signals in the two directions, could the be placed in front of the wave packets. Based on such wave packet(s), the travel time $TOF_1$ of the measurement signal is registered, or the travel times $TOF_1$ and $TOF_2$ of the measurement signals are registered. The time t between the individual bursts of the following wave packets is then determined based on the travel times $TOF_1$ and $TOF_2$. Thus, time t is set, for example, to $t=2*TOF_1$, or to $t=TOF_1+TOF_2$.

According to an additional further development of the method of the invention, the measurement signals and the reflections of the measurement signals at the sensors are so matched to one another that they mutually strengthen one another.

Naturally, the time t between transmitting of the first measurement signal by the first sensor and transmitting of the second measurement signal by the first sensor can, according to the method of the invention, be so selected that the amplitude of a received measurement signal at the second sensor is maximum.

In additional further development of the invention, flow velocity of a measured medium in a measuring tube is ascertained by means of the time t and by means of a time x between transmitting of the second measurement signal by the first sensor and receipt of a measurement signal by the second sensor.

If the diameter of the measuring tube is likewise known, then, also the flow rate of the measured medium through the measuring tube can be ascertained. Alternatively, this can happen by means of the time t and the travel time $TOF_1$. Mathematically, this alternative is equivalent to the named further development, wherein metrologically not the travel time $TOF_1$ is directly measured, but, instead, only the time x between transmitting the first measurement signal by the first sensor and receipt of the measurement signal by the second sensor. Advantageously, this happens when the time t is so selected that x is smaller than t/2, especially that $T=TOF_1-x$.

Furthermore, the object of the invention is achieved by a measuring device for measuring a fill level of a measured medium in a container or for measuring flow of a measured medium through a measuring tube, wherein the measuring device comprises a first sensor for transmitting measurement signals in the form of mechanical or electromagnetic waves and at least one additional, second sensor for receiving the measurement signals, wherein the travel times $TOF_1$ and/or $TOF_2$ of the measurement signals between transmitting of the measurement signals and receiving of the measurement signals are/is known, especially are measurable, and the measuring device additionally has a control unit, wherein at least the first sensor is excitable by the control unit for transmitting a first measurement signal and, at a time t measured from the first measurement signal, for transmitting at least one additional, second measurement signal, wherein the time t is so selectable that the time t is a whole numbered multiple of the travel time $TOF_1$ of the first measurement signal. Especially, the measuring device is a fill-level measuring device, such as e.g. a radar- or an ultrasonic, fill-level measuring device, or the measuring device of the invention is a flow measuring device, e.g. an ultrasonic, flow measuring device, especially a clamp-on or an inline, ultrasonic, flow measuring device. Then, however, the time t especially is so selectable that the time t is a whole numbered multiple of $(TOF_1+TOF_2)/2$.

For example, a first, or first time exceeding of a predeterminable threshold value of the respective measurement signal triggers a trigger signal, which designates the beginning of the measurement signal, this meaning thus the travel time $TOF_1$ is registerable, which is measurable between the first exceeding of the predeterminable threshold value of the first measurement signal at the first sensor and the first exceeding of the threshold value of the first measurement signal at the second sensor. Analogous concepts hold, in turn, for the travel time $TOF_2$, which is measurable between the first exceeding of the predeterminable threshold value of the third measurement signal at the second sensor and the first exceeding of the threshold value of the third measurement signal at the first sensor. Associated with the control unit is e.g. a clock, wherein then the travel times $TOF_1$ and/or $TOF_2$ are calculable by the control unit.

Or the object of the invention is achieved by a measuring device for measuring a fill level of a measured medium in a container or of a flow of a measured medium through a measuring tube, wherein the measuring device comprises a first sensor for transmitting measurement signals in the form of mechanical or electromagnetic waves and at least a second sensor for receiving the measurement signals, wherein a travel time $TOF_1$ of the measurement signals is the travel time between transmitting of the measurement signals by the first sensor and receiving of the measurement signals by the second sensor, and a control unit, wherein at least the first sensor is excitable by the control unit for transmitting a first measurement signal and, at a time t measured from the first measurement signal, for transmitting at least a second measurement signal, wherein the time t is so selectable that an amplitude of a measurement signal received at the second sensor is maximum.

BRIEF DESCRIPTION OF THE DRAWINGS

The invention will now be explained in greater detail. Equal elements are provided with equal reference characters in the figures of the drawing. The figures of the drawing show as follows.

DETAILED DISCUSSION IN CONJUNCTION WITH THE DRAWINGS

Figure 1:
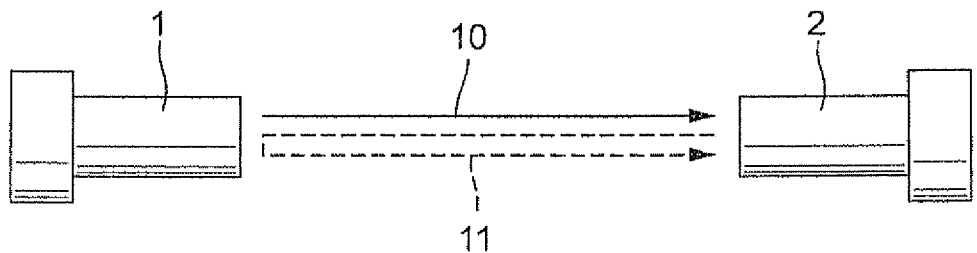
FIG. 1 shows two oppositely arranged, ultrasonic sensors of an ultrasonic, flow measuring device.

FIG. 1 shows schematically an inline, ultrasonic, flow measuring device with two opposing ultrasonic sensors. The first sensor 1 transmits ultrasonic signals to the second sensor 2. Drawn in are the direct, first signal path 10, thus the direct path of a measurement signal from the first sensor 1 to the second sensor 2, and the measurement signal, which is reflected from the second sensor 2 back to the first sensor 1 and from there back to the second sensor 2, thus the second signal path 11. The reflection by the first sensor 1 to the second sensor 2 points, in such case, in the direction of the first measurement signal. Such a reflection can naturally repeat a number of times.

Figure 2:
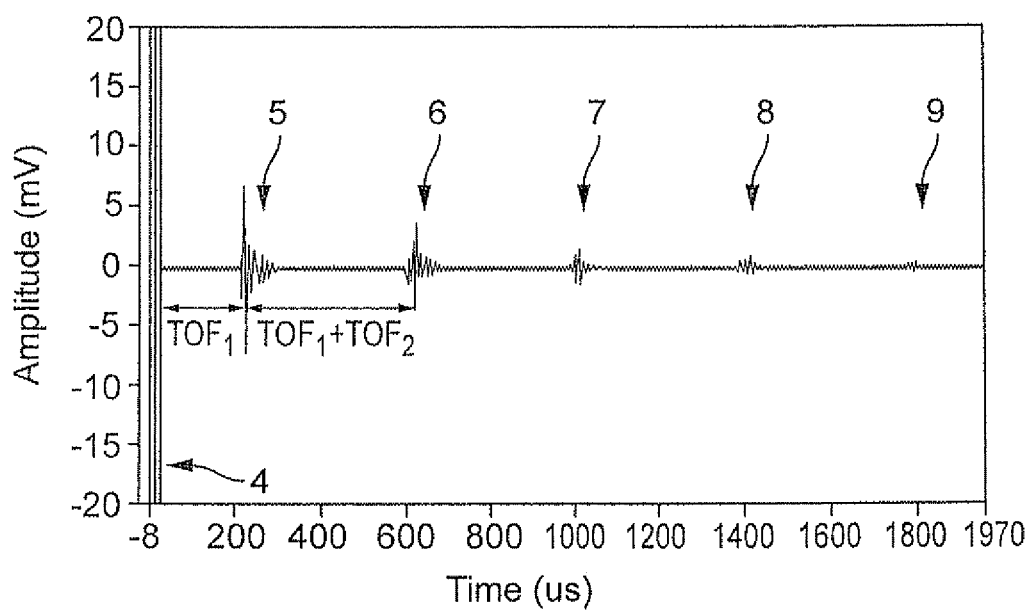
FIG. 2 shows the time curve of the measurement signals at the second sensor, without application of the method of the invention.

For this arrangement then FIG. 2 shows the time amplitude curve at the second sensor. Additionally, the burst 4 at the first sensor is drawn in. Besides the burst 4 at the first sensor, the diagram shows the incoming direct measurement signal 5, as detected by the second sensor, and the reflections 6-9, as they are likewise measured by the second sensor. Between the burst 4 and the direct measurement signal 5, measured by the second sensor, there passes the travel time $TOF_1$ of the measurement signal from the first to the second sensor. As shown in FIG. 1, the measurement signal is then reflected from the second sensor to the first sensor and back to the second sensor. In such case, naturally, twice the path is traveled, which, however, not necessarily mean that also twice the travel time $TOF_1$ elapses. For, since the measured medium is flowing between the ultrasonic sensors 1 and 2, the sound is "entrained" by the medium—the fact is utilized that the propagation velocity of ultrasonic waves in a medium is influenced directly by its flow velocity. The same is true for the additional reflections 7, 8 and 9.

Figure 3:
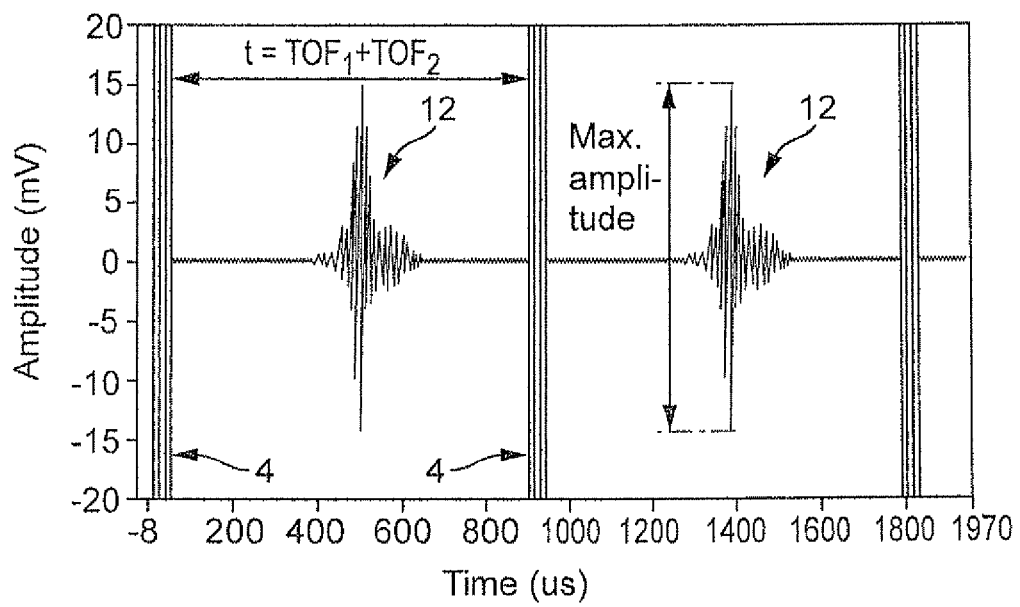
FIG. 3 shows the time curve of the measurement signals superimposed at the first and second sensors with application of the method of the invention.

If, then, the time t between two bursts 4, which are transmitted by the first sensor to the second sensor, is set to a whole numbered multiple of $(TOF_1+TOF_2)/2$, here to $TOF_1+TOF_2$, then the second sensor measures a signal superimposed from the direct measurement signal 5 and the reflections 6-9, especially from the direct measurement signal 5 and the first reflection 6, as sketched in FIG. 3. Through the phase equality of the direct measurement signal 5 and the reflections 6-9, especially the first reflection 6, mutual amplification of the signals results and, therewith, a clearly receivable signal.

The measurement signal is so embodied at the transmitter corresponding to certain process variables that the measurement signal incoming at the receiver is clearly receivable. The waves following one another are so determined that they mutually strengthen on another. The travel times $TOF_1$ and $TOF_2$ are dependent on certain process variables, such as e.g. the velocity of sound in the measured medium, geometric variables, such as e.g. the spacing of the two sensors relative to one another, and naturally on the flow of the measured medium through the measuring tube.

Equally, shows FIG. 3 the maximum amplitude in the steady state system, which is measured at the second sensor. According to the invention, the time t of both bursts 4 can be varied, until the amplitude of the measured signal at the second sensor is maximum. The time t amounts in this example, usually to the sum of $TOF_1$ and $TOF_2$ divided by a natural number.

Figure 4:
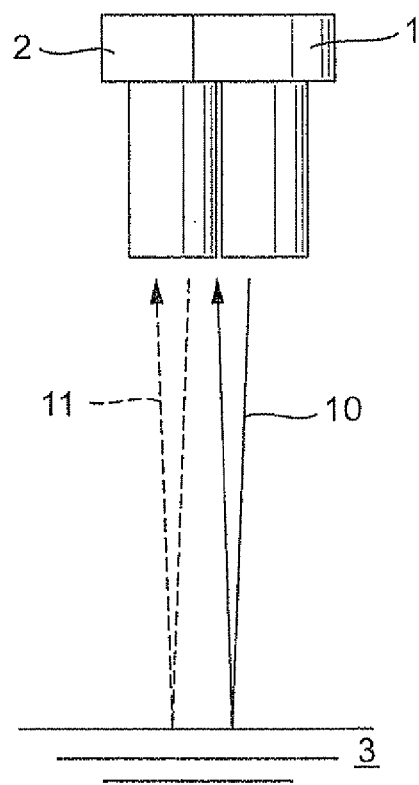
FIG. 4 shows a fill-level measuring device with two ultrasonic sensors.

FIG. 4 illustrated a fill-level measuring device with two ultrasonic sensors. In such case, the ultrasonic sensors 1 and 2 are arranged parallel to the surface of the measured medium 3. Both the first signal path 10 of the direct measurement signal as well as also the second signal path 11 of the reflections are drawn. $TOF_1$ and $TOF_2$ would here naturally be equal, so that a registering of $TOF_2$ by means of a third measurement signal is omitted. The sensors 1 and 2 can then specially be embodied as pure transmitter or pure receiver.

Figure 5:
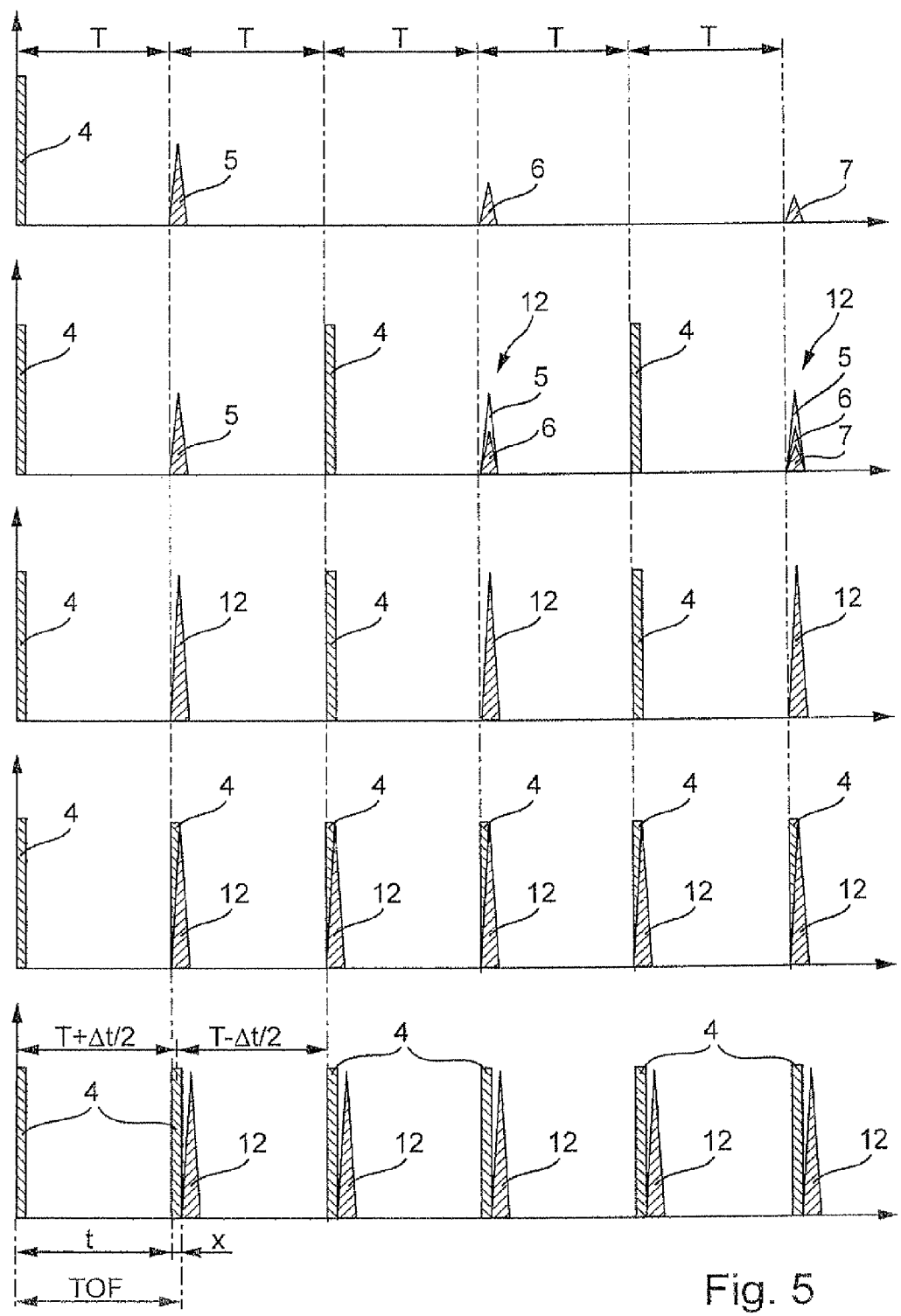
FIG. 5 shows time amplitude curves at the first and second sensors.

FIG. 5 shows both the amplitude curves emitted by the first sensor, as well as also the amplitude curves received by the second sensor together in a plurality of juxtaposed, idealized, time representations, with reference to an experimental setup, as shown in FIG. 1, with two opposing ultrasonic sensors for measuring flow of a measured medium in a measuring tube located between the two ultrasonic sensors. The measurement signals transmitted from the first sensor have, in such case, rectangular shape. The signals 12 received by the second sensor are, in contrast, shown as triangles. The ordinates show the signal amplitudes qualitatively, while time is plotted on the abscissa.

In the first amplitude curve, a first measurement signal is transmitted from the first sensor at the point in time zero in the form of a burst 4. After a time T it is received by the second sensor as direct measurement signal 5. Thereafter, it is reflected back to the first sensor, which again requires the time T, when the measured medium in the measuring tube has no flow velocity, thus is at rest. It is not received by the first sensor, since, in this example, the first sensor is embodied only as an ultrasound transmitter and the second sensor only as an ultrasound receiver. Thus, after an additional period T, the measurement signal is reflected again, in such case by the first sensor back to the second sensor, and is registered as first echo 6 by the second sensor. Second echo 7 and a third echo arise equally through reflections of the first echo 6, respectively of the second echo 7.

If, now, in the case of the above discussed, experimental setup with a measured medium at rest, the first sensor transmits a further burst 4, thus a second measurement signal, at a time of 2*T, then the direct measurement signal 5 of the second burst 4 superimposes on the first echo 6 of the first burst at the second sensor, and the second echo 7 of the first burst is superimposed with the first echo 6 of the second burst and the direct measurement signal 5 of a third burst 4 at the second sensor.

Thus, the amplitudes of the measurement signals 12 received by the second sensor are maximized by these superimposings, as the third amplitude curve makes clear, wherein, in such case, at points in time less than zero, measurement signals were already transmitted from the first sensor.

The setting of the time t between the measurement signals 4 to be transmitted from the first sensor, thus especially between the first measurement signal and the second measurement signal, which here amounts to 2*t, can be accomplished by measuring the TOF, here $TOF_1$, which, in this case, is equal to T, and by correspondingly adjusting t, or by varying the time t between the two measurement signals 4 transmitted from the first sensor, thus at least between a first and a second measurement signal, here the first burst 4 and the second burst 4, until the amplitude of the measurement signal 12 received by the second sensor is maximum.

In the fourth amplitude curve, the time between two measurement signals transmitted from the first sensor amounts to T, instead 2*T as above. Therewith, the measurement signals 12 registered by the second sensor fall timewise together with the measurement signals 4 transmitted from the first sensor. This is for zero flow.

If the flow of the measured medium, through which sound is traveling in the measuring tube, is not equal to zero, then an ultrasonic signal in the direction of the flow of the measured medium through the measuring tube is faster than an ultrasonic signal counter to the flow of the measured medium through the measuring tube. This physical principle is utilized for the travel-time difference measurement. Now it is assumed that a not to be neglected velocity component of the flow of the measured medium in the measuring tube is counter to the direction of the first measurement signal, thus in the direction from the first sensor to the second sensor.

The first measurement signal 4 is transmitted from the first sensor to the second sensor, there reflected back to the first sensor and then, in turn, reflected to the second sensor. In such case, it is on the trip from the first sensor to the second sensor slower and from the second sensor to the first sensor faster. Since then the first, as well as also all additional echos, retrace the distance from the first sensor to the second sensor and back, the velocity differences cancel and there remains only the influence of the velocity component of the measured medium on the direct, first measurement signal from the first sensor to the second sensor. Thus, the first measurement signal is slower from the first sensor to the second sensor than in the case of zero flow. The signal of the reflection from the second to the first sensor is, indeed, traveled faster, however, the reflection from the first back to the second sensor requires a longer time. Thus, the signals 12 measured by the second sensor are offset by a time x in comparison to zero flow. This time x is the difference between $TOF_1$ and t, it is: $X=TOF_1-t$ and x corresponds, in such case, to half the conventionally ascertained travel-time difference $\Delta t$ between the measurement signals in, and counter to, the flow direction, and, respectively, the velocity component, of the measured medium in the measuring tube, thus $x=\Delta t/2$. It is possible, however, not only to measure $TOF_1$, as usual, but, also, the time x can be directly measured, which offers metrological advantages. Since also the time t is known, then the flow velocity, and in the case of known diameter of the measuring tube, also the flow of the measured medium through the measuring tube can be ascertained.

The invention claimed is:

1. A method for measuring at least one measured variable, comprising the step of:
   providing a first sensor for transmitting a first measurement signal in an enclosure containing a medium; and
   at a time t from the first measurement signal, the first sensor transmitting at least a second measurement signal, wherein at least a second sensor receives the measurement signals and reflections of the first measurement signal from any of the enclosure, the second sensor and said medium, wherein:
   the time t is so selected that the amplitude of a third measurement signal, which is a composition of the second measurement signal and the reflections of the first measurement signal, received by the second sensor is maximized by a superpositioning of the second measurement signal and reflections of the first measurement signal.

2. The method for measuring at least one measured variable as claimed in claim 1, wherein:
   the first measurement signal is reflected at the second sensor back to the first sensor and by the first sensor back to the second, sensor and the second measurement signal is superimposed with the first measurement signal reflected by the first sensor back to the second sensor.

3. The method for measuring at least one measured variable as claimed in claim 1, wherein:
   the time t is varied over a predetermined range.

4. The method for measuring at least one measured variable as claimed in claim 1, wherein:
   by means of the time t, the velocity of sound in a measured medium is ascertained; and/or
   by means of the time t, the fill level of a measured medium in a container is ascertained.

5. The method for measuring at least one measured variable as claimed in claim 1, wherein:
   a travel time $TOF_1$ is the travel time of the first measurement signal between transmitting of the first measurement signal by the first sensor and receiving of the first measurement signal by the second sensor; and
   a travel time $TOF_2$ is the travel time of a third measurement signal between the second sensor and the first sensor, the time t is so selected that:
   $T=(TOF_1+TOF_2)/n$, with $n=1, 2, 3, \ldots$ of a natural number.

6. The method for measuring at least one measured variable as claimed in claim 5, wherein:
   the travel times $TOF_1$ and $TOF_2$ are measured.

7. The method for measuring at least one measured variable as claimed in claim 5, wherein:
   the time t is so selected that it is a whole numbered multiple of the average value of the travel times $TOF_1$ and $TOF_2$.

8. The method for measuring at least one measured variable as claimed in claim 5, wherein:
   the time t is determined such that the time t is greater than or equal to half the wavelength $\lambda$ of the mechanical wave or the electromagnetic wave.

9. The method for measuring at least one measured variable as claimed in claim 5, wherein:
   the travel time $TOF_1$ of the first measurement signal between transmitting of the first measurement signal from the first sensor and receiving of the first measurement signal by the second sensor is measured; and/or
   the travel time $TOF_2$ of the third measurement signal between transmitting of the third measurement signal from the second sensor and receiving of the third measurement signal by the first sensor is measured.

10. The method for measuring at least one measured variable as claimed in claim 5, wherein:
    the travel time $TOF_1$ of the first measurement signal between transmitting of the first measurement signal from the first sensor and receiving of the first measurement signal by the second sensor is determined between the points in time of a first exceeding of a predeterminable threshold value of the first measurement signal at the first sensor and a first exceeding of the threshold value of the first measurement signal at the second sensor.

11. The method for measuring at least one measured variable as claimed in claim 5, wherein:
    the time t between transmitting of the first measurement signal from the first sensor and transmitting of the second measurement signal by the first sensor is determined between the points in time of a first exceeding of a certain threshold value of the first measurement signal at the first sensor and a first exceeding of the threshold value of the second measurement signal at the first sensor.

12. The method for measuring at least one measured variable as claimed in claim 5, wherein:
    the time t between transmitting of the first measurement signal from the first sensor and transmitting of the second measurement signal from the first sensor is determined according to the steps of:
    providing a first sensor for transmitting a first measurement signal; and
    at a time t from the first measurement signal, transmits at least a second measurement signal, wherein at least a second sensor receives the measurement signals, wherein:
    the time t is so selected that the amplitude of a measurement signal received by the second sensor is maximized by a superpositioning of the second measurement signal and reflections of the first measurement signal.

13. The method for measuring at least one measured variable as claimed in claim 1, wherein:
flow velocity of a measured medium in a measuring tube is ascertained by means of the time t and a time x between transmitting the second measurement signal from the first sensor and receiving a measurement signal by the second sensor.

* * * * *